(12) United States Patent
Baldwin

(10) Patent No.: US 6,740,185 B2
(45) Date of Patent: May 25, 2004

(54) METHOD OF PREPARING PREFORMS FOR RTM MOLDING PROCESSES

(75) Inventor: Jack Wilbur Baldwin, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 09/777,942

(22) Filed: Feb. 6, 2001

(65) Prior Publication Data

US 2002/0117252 A1 Aug. 29, 2002

(51) Int. Cl.⁷ .................. B29B 11/16; B29C 70/40; B29C 70/48
(52) U.S. Cl. .............. 156/242; 156/166; 156/180; 156/245; 156/291; 156/250; 156/264; 156/184; 264/134; 264/135; 264/136; 264/137
(58) Field of Search ............ 156/180, 245, 156/250, 264, 184, 166, 242, 291; 264/131, 132, 133, 134, 135, 136

(56) References Cited

U.S. PATENT DOCUMENTS

| | | | | |
|---|---|---|---|---|
| 3,616,036 A | * | 10/1971 | Anderson | 156/298 |
| 3,885,074 A | * | 5/1975 | Chandler | 156/211 |
| 4,590,855 A | * | 5/1986 | Schommer et al. | 101/157 |
| 4,879,949 A | * | 11/1989 | Vennike | 101/157 |
| 5,042,111 A | * | 8/1991 | Iyer et al. | 19/65 T |
| 5,094,883 A | * | 3/1992 | Muzzy et al. | 427/185 |
| 5,480,603 A | * | 1/1996 | Lopez et al. | 264/131 |
| 6,096,669 A | * | 8/2000 | Colegrove et al. | 442/366 |

FOREIGN PATENT DOCUMENTS

WO    WO-98/50211 A1 * 11/1998

* cited by examiner

*Primary Examiner*—Jeff H. Aftergut
(74) *Attorney, Agent, or Firm*—K. Scott O'Brian; Carmen Santa Maria; McNees Wallace & Nurick

(57) ABSTRACT

The present invention provides for a method of manufacturing a preform for a RTM molding process that will increase both the handling capability of the preform and the final part quality. The invention consists of applying a patterned discontinuous layer of liquid resin over at least one side of a layer of reinforcing fibers. The resin film can consist of a homogeneous liquid, an aqueous dispersion or a melted resin applied at an elevated temperature. In one embodiment, there is present a roller having a patterned surface. Liquid resin is applied to the surface of the patterned roller via a second roller. The layer of reinforcing fibers is passed by the roller in such a fashion that the resin from the pattern on the surface of the roller is transferred to the layer of reinforcing fibers. The contact of the roller with the layer of reinforcing fibers is sufficient to force some of the resin into the fibers themselves. After the resin is applied, the layer of reinforcing fibers with resin is passed through an additional process to cause the resin to turn into a solid flexible coating. The layer of fiber is then wrapped onto a cardboard roll or similar type material and packaged for storage or shipment.

14 Claims, 2 Drawing Sheets

METHOD OF PREPARING PREFORMS FOR RTM MOLDING PROCESSES

FIELD OF THE INVENTION

This invention relates to the manufacture of a fiber reinforced composite article using resin transfer molding, and, and more particularly, to an improved method of adhering or bonding the layers of composite fabrics made of fibrous material to provide an improved composite preform.

BACKGROUND OF THE INVENTION

Because of its high strength to weight ratio, fiber reinforced composite structures have become attractive for aerospace applications, such as parts for airframes and propulsion power plants including gas turbine engines. These structures, made from fiber-reinforced materials, such as yams, fibers, filaments and the like, have substantial rigidity and other properties, which make them desirable for many applications. Certain of the composite fabrics comprising these structures even have sufficient rigidity and strength so that they can be formed into components previously made from metals. For example, many composite fabrics have sufficient strength, rigidity, impact resistance and other desirable properties to make them useful materials for gas turbine blade members, for example, fan blades for jet engines.

Resin transfer molding (RTM) is one process used to make these fiber-reinforced composite structures. Layers of reinforcing material of a predetermined shape, known as preforms, are loaded into a mold, and a thermosetting or EM wavelength activated resin binder is injected into the mold and cured by known procedures to provide a finished composite piece. Molding of such parts has been relatively time consuming and labor intensive, in part, because of the need to properly position and align the layers of preform accurately in the mold.

In order to mechanically hold the preform layers of substantially dry reinforcing fabrics and to prevent damage to the yams, fibers and/or filaments in the stacked assembly of such dry fabric layers during various operations, a resin, usually a thermoplastic, is used as a binder or "tackifier" to stiffen the reinforcing fabric and hold it in place before the molding process begins.

Methods of impregnating fiber with a tackifier are well known. For example, in U.S Pat. No. 5,382,148, a tackifier having two distinct curing stages is continuously applied by way of a sprayer as a spray to a glass fiber mat to effectuate a thin, penetrating random disposition of droplets. Upon curing of both stages, a rigid preform is produced.

U.S. Pat. No. 5,041,260 discloses a spray-up process, wherein chopped glass roving or other chopped fiber reinforcement material is sprayed onto a forming mandrel from a chopper gun. The fibers may be resin coated or a small amount of resin may be introduced into the stream of chopped fibers to cause it to be retained on the mandrel. A web is then placed in direct contact with and encapsulates at least a portion of the sprayed reinforcement material.

Similar methods, such as U.S. Pat. No. 5,688,467 utilize a fiber nozzle to blow a stream of chopped fibers onto a screen, and a tackifier nozzle to continuously spray tackifier into the fiber stream. A ducted fan creates a vacuum and helps to draw and hold the fibers onto the screen.

Other prior art methods, such as disclosed in U.S. Pat. No. 5,698,318, set forth processes in which individual fiber plies are sprinkled with a solid powder of the tackifier. The powder is heated to fuse it onto the surface of the substrate and then cooled to solidify it. The different plies can be stacked together, heated to fuse the plies together, and then cooled leaving a preform to be placed into a mold for use in an ordinary RTM process. The tackifier, in powder form, is not applied to the fiber plies in any predetermined discontinuous pattern, and preferably is applied evenly across the plies.

The RTM process consists of placing these preforms of predetermined shape into a mold. The mold is closed, and vacuum may or may not be applied to the closed mold. A liquid resin is injected into the mold, the resin injection process continuing until the mold is completely filled and no resin free areas are left in the mold. At the completion of the injection process, the resin is then cured in the case of reactive resin systems, or it is cooled in the case of thermoplastic resin systems. Upon cooling, the mold is opened and the part is removed.

Critical to the success of the RTM process is the construction of the preform. The preform must be constructed in such a manner as to allow for handling and placement into the RTM mold. Stabilization of the preform is achieved by applying tackifier to the surface of each layer of reinforcing fibers. The amount of tackifier and its location on the layer of reinforcing fibers can greatly affect the handleability, the stackability and the injectability of the preform.

One problem with the above described methods of applying the tackifier is that powder systems can result in a layer of powder that will not go into solution in the RTM resin, significantly reducing the mechanical properties in the final part. Continuous film spraying methods may leave too much resin on the layer of reinforcing fibers resulting in reduced RTM resin injection capability thereby weakening the final part, lack of flexibility in the preform and high potential for void formation in the final part.

There is, therefor, a continuous need for improved designs for preform manufacturing methods that will increase both handling capability and quality of the final part. The present invention fulfills this need, and further provides related advantages.

BRIEF SUMMARY OF THE INVENTION

The present invention provides for a method of manufacturing a preform that will increase both the handling capabilities of the preform and the final part quality. The invention consists of applying a patterned discontinuous layer of liquid resin over one or both sides of a layer of reinforcing fibers. The resin film can consist of a homogeneous liquid, an aqueous dispersion of resin powder or particles or a resin applied at an elevated temperature at which it is fluid, but which solidifies on cooling to ambient temperatures.

In one embodiment, there is present a roller having a patterned surface. Liquid resin is applied to the surface of the patterned roller. The layer of reinforcing fibers is passed over the roller, contacting the surface so that the resin from the pattern on the surface of the roller is transferred to the layer of reinforcing fibers. The contact of the roller with the layer of reinforcing fibers is sufficient to force some of the resin between the fibers themselves. After the resin is applied, the layer of reinforcing fibers with resin is passed through an additional process to cause the resin to turn into a solid flexible coating. The layer of fiber is then wrapped onto a cardboard roll or similar type material and packaged for storage or subsequent shipment.

One advantage of the present invention is that the patterned roller provides a reduced amount of tackifier resin, but sufficient resin to adhere layers for handling purposes and placing them in a preform, resulting in a significant decrease in the probability of the tackifier not going into solution in the RTM resin.

Another advantage is that decreasing the amount of resin applied to the layer of reinforcing fibers increases the preform flexibility. This is especially important when subsequent process operations are needed on the preform to achieve net shape or near net shape prior to loading into the RTM molding tool.

Still another advantage is that the method of applying the tackifier of the present invention can be used with any type of fiber, such as carbon fibers, graphic fibers, glass fibers, aramid fibers or any combination thereof.

Yet another advantage is that the present method has the flexibility to use resins that are liquid at room temperature as well as those resins that become liquid at elevated temperature.

The present invention also has the flexibility to be applied to one or both sides of the layer of reinforcing fibers and a further advantage in that the resin chemistry can be epoxy based, typically with curative bis-maleimides, and thermoplastic such as a polyester, or an aqueous system such as polyvinyl alcohol.

Yet another advantage of the present invention is that the discontinuous film of tackifier resin applies by the patterned roller to the layer of reinforcing fibers enhances the subsequent resin flow through the fiber preform during the RTM process.

Other features and advantages of the present invention will be apparent from the following more detailed description of the preferred embodiment, taken in conjunction with the accompanying figures which illustrate, by way of example, the principles of the invention.

DETAILED DESCRIPTION OF THE INVENTION

Figure 1:
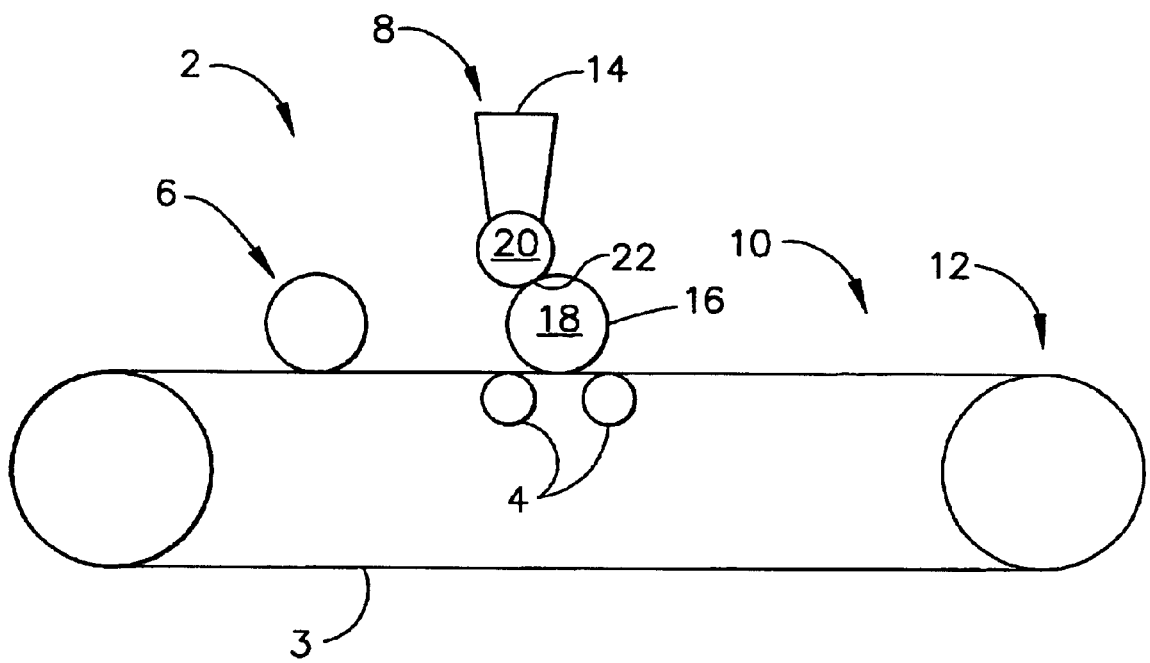
FIG. 1 is a schematic representation illustrating the method of the invention so as to coat a single side of the reinforcement fiber layer.

Referring now to the figures, there is shown in FIG. 1 a schematic representation illustrating a transport system 2 and all of the elements for carrying out the method of the present invention. For illustrative purposes, the method of the present invention can be described as having a plurality of stages spaced along the transport system 2, for example, a conveyor belt 3 which is supported for travel along a defined path by a plurality of bottom rollers 4. The system comprises a fiber preparation and application stage 6, a tackifier application stage 8, a curing or setting stage 10 and a storage stage 12.

At the fiber preparation stage 6, reinforcement fibers (not shown) are prepared in, for example, a uni-directional, bi-directional, or random fashion using known methods and deposited on the upper surface of transport system 2 as a layer. The fibers may be, for example, uni-directionally oriented fibers in a tape, fibers running bi-directionally in woven cloth, or they may be chopped fibers randomly orientated by, for example, being blown onto the transport system, with or without vacuum, using, for example, nozzles, or other known methods.

After completion of the RTM process (not shown), uni-directional fiber plies provide excellent strength in the direction parallel to the fibers, while woven cloth fiber plies provide excellent strength in the plane of the woven cloth. A fiber mat having randomly oriented fibers, hereinafter also referred to as random fiber mat, will not be as strong as the uni-directionally oriented plies or the woven cloth plies in their directions of maximum strength, but will have approximately the same strength in all directions.

The fibers may be, for example, carbon fibers, fiberglass fibers, aramid fibers, metal fibers, ceramic fibers including, for example, silicon carbide fibers, thermoplastic fibers or any other fibers such as, for example, glass or glass/ceramic fibers including alumina, sapphire and silica and mixtures thereof. The fibers may be non-coated but frequently are coated for various reasons, such as to improve bonding to matrix material or to protect the fiber.

The only limitation on fiber selection is based on the ability of the fiber to withstand the loads and the temperatures of the selected application. In certain applications, yarn comprised of fibers may be used. Additionally, ceramic fiber embedded in ceramic matrix (CMC), such as SiC/SiC composite may be utilized.

The layer of fibers is received at the tackifier application station 8. A liquid tackifier resin, drawn from a supply 14, is applied to the surface 16 of a patterned roller 18 via an applicator 24, for example, a supply roller 20. A first surface of a layer of reinforcing fibers is passed over the patterned roller 18 in such a fashion that the tackifier from the pattern on the surface 16 of the patterned roller 18 is transferred to the first surface of the layer of reinforcing fibers. Optionally, a second patterned roller 18 and second supply 20 roller may be utilized to apply tackifier to a second surface opposite the first surface of the layer of reinforcing fibers.

The tackifier is applied in a generally small amount, about one quarter percent to about ten percent of the areal weight (weight per square yard of fiber) of the reinforcing fiber. This equates to about 30 volume percent to about 40 volume percent by weight of resin being added to the reinforcement fibers during subsequent molding operations. The tackifier may be any resin capable of transforming from a liquid state to a solid or semisolid state and also be soluble within the subsequently added RTM resin. A lower ratio of tackifier to RTM resin results in better mechanical properties of the final product. The chemistry of the tackifier is formulated for stabilizing the preform during handling and placement into the mold, but it is not optimized for final product mechanical properties. Therefore, the final product will have resultant weakness between preform layers unless the use of the tackifier is minimized and if the tackifier is not substantially dissolved in the resin during a molding process such as RTM.

Tackifier resins suitable for RTM processes are well known to the skilled of the art and include many commercially available resins. The resin film can consist of a homogeneous liquid, an aqueous dispersion or a melted resin applied at an elevated temperature. Suitable resins include both thermoplastics and thermosetting resins. The tackifier resin chemistry may be, for example, at least one epoxy resin and at least one curing agent which is capable of reacting with the epoxy resin. The epoxy resin may be, for example, poly (glycidyl ethers) of one or more polyhydric phenols, such as biphenols, bis-phenols (such as bis-phenol A or bis-phenol F), novolac resins, phenol-hydrocarbon resins, and halogenated variations of those resins. The curing agent will preferably not cure with the epoxy resin at ambient temperatures without a catalyst, for example, polyhydric phenols and/or phenolic resins, carboxylic acids, carboxylic acid anhydrides or mixtures thereof. The tackifier may optionally contain other, non-catalytic components, for example, thermoplastic polymers, rubbers or elastomers or other modifiers.

It is preferable to use resins that are liquid at room temperature; however, resins that become liquid at elevated temperature may also be used. In the case of the latter, a heated resin supply 14 and heated supply roller 20 would be used.

Figure 2:
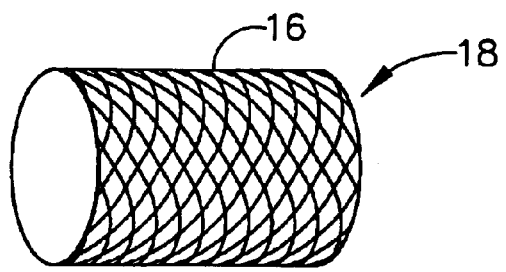
FIG. 2 is a representation of a frontal view of one form of the patterned roller.

As shown in FIG. 2, at least one patterned roller 18 is patterned so as to apply a discontinuous film of tackifier to a first layer of reinforcing fibers. A discontinuous film not only allows for better penetration of the RTM resin, it also aids in reducing bulk in final product that requires multi layers of preform. Optionally, a discontinuous film may be sprayed on to the layer of reinforcing fibers, or a discontinuous film may be transferred from a release sheet to the layer of reinforcing fibers. The pattern on the patterned roller 18 may take the form of any design capable of laying down a patterned discontinuous layer of tackifier, for example, a herringbone pattern, a striped pattern, or any other pattern that can readily transfer the tackifier to the reinforcing fibers.

The supply roller 20 and patterned roller 18 may be manufactured from any material impervious to, and non-reactive with the tackifier, such as metal, for example, steel, stainless steel, or plastic. The roller can conveniently be made of a phenolic resin cylinder with a central axle that is attached to a set of bearings. Rollers of this design are used in the printing industry to apply ink patterns to paper. The rollers are positioned such that the supply roller 20 receives a replenishing supply of tackifier, for example by a feed tube (not shown) and applies a constant coat of tackifier to the patterned roller 18, for example, by maintaining a constant contact line 22 with the patterned roller 18.

The patterned roller 18 is positioned such that the contact of the patterned roller with the reinforcing fibers is sufficient to force some of the resin into the fibers themselves. While in the preferred embodiment, there is a single patterned roller 18 spanning the width of the conveyor 2, optionally, there may be a plurality of patterned rollers 18 of lesser width, positioned so to provide complete discontinuous coverage.

After application of the tackifier, the layer of reinforcing fibers is passed through a curing or setting stage 10 to cause the resin to turn into a solid flexible coating. This curing or setting process may be, for example, cooling, for example, air cooling in the case of a tackifier applied at an elevated temperature, or exposure to a predetermined wavelength of EM radiation in the case of light initiated tackifier. The tackifier may undergo a self-curing process after application. Alternatively, for tackifiers that are aqueous dispersions, the tackifier-containing layer may be passed through a water evaporation process.

Following the curing or setting process, the reinforcing fiber (now bound by the tackifier) is passed to a storage stage 12. The layer of tackified fiber may be, for example, wrapped onto a roll, for example, a cardboard roll or similar type material, or it may be cut and stacked, whereupon it is packaged for storage or subsequent shipment.

In a different embodiment, rather than a supply roller 20 and patterned roller 18, the applicator 24 comprises at least one spray nozzle (not shown) positioned to spray a patterned discontinuous layer of tackifier onto the passing reinforcement fibers. This discontinuous spray may be controlled by, for example, a patterned nozzle head, a predetermined movement of the nozzle, a predetermined variation in flow amount or a combination of the above. The nozzle receives a constant supply of tackifier through, for example, a supply tube. Typical spray patterns of this type are well known and used in the construction industry to laminate thin layers of board. An epoxy resin used as an adhesive is pressurized to about 30 psi and supplied to the spray nozzle. The spray nozzle dispenses the epoxy resin in a narrow stream. During the dispensing operation, the nozzle oscillates back and forth in a regular motion. This creates a regular pattern of resin on top of the board. When complete, there is a regular but discontinuous pattern of epoxy resin adhesive deposited on the board. This pattern significantly reduces the amount of adhesive resin required for bonding boards together.

In yet another embodiment, the patterned discontinuous layer of tackifier is applied using a release sheet to the layer of reinforcing fibers. The release sheet contains tackifier applied to the sheet in a predetermined pattern. When placed in contact with the layer of reinforcing fibers, the coefficient of friction between the tackifier and the release sheet is less than the coefficient of friction between the tackifier and fiber layer. Therefore, when the release sheet is separated from the fiber layer, the tackifier is transferred to the fiber layer in the predetermined, non-continuous pattern.

Figure 3:
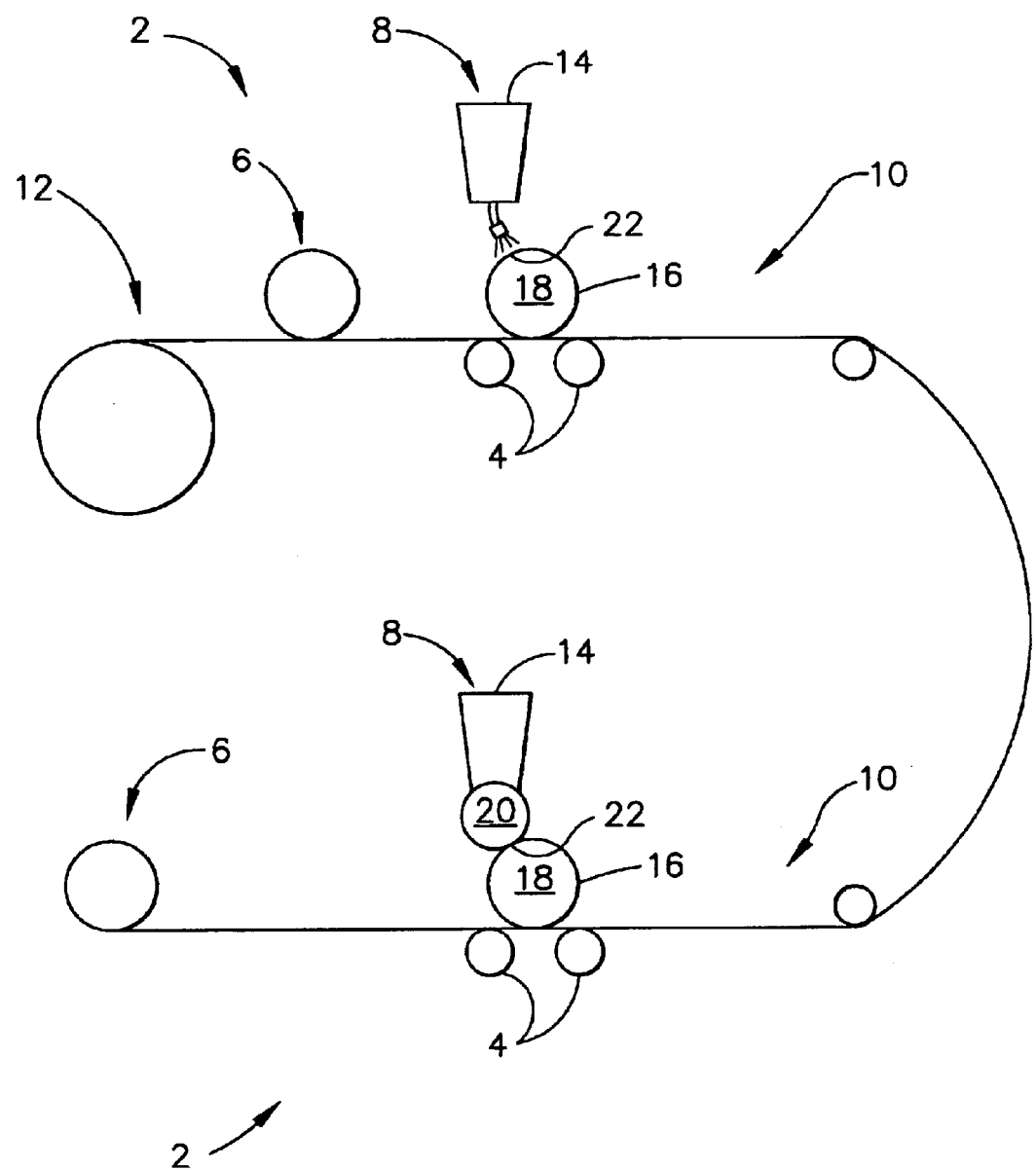
FIG. 3 is a schematic representation illustrating the method of the invention so as to coat both sides of the reinforcement fiber layer.

In still another embodiment, a coating of tackifier may be applied to the second, as yet non-coated side of the reinforcing fiber layer, in the manner described above. This may occur, for example, after curing or setting of the first tackifier coating, thus allowing the now tackified preform to be conveyed to expose the untreated fiber side, as shown in FIG. 3. Any convenient arrangement of rollers well known in the art may be used to skim the tackifier onto both sides of the fiber layer, either individually or simultaneously. The same form of application may be utilized on each side, or alternatively, different application forms may be used, for example, a patterned roller 18 can be used on one side and a release film on the other.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A method of preparing of preparing a fiber-reinforced composite article for use in a gas turbine engine, comprising the steps of:

forming a layer of reinforcing fibers;

applying a patterned discontinuous, homogenous liquid coating of adhesive tackifier resin in a predetermined amount to at least one side of the layer of reinforcing fibers to form a tacky ply, wherein a portion of the predetermined amount of the tackifier resin being forced into a number of the fibers;

assembling a plurality of the plies to form a preform, the predetermined amount of adhesive tackifier resin being sufficient to maintain the assembled plies in a shape of the preform;

placing the preform into a mold; then injecting a second resin in liquid form into the mold to form a continuous matrix of resin between and around the plies of the preform; and curing the preform to form a near net shape article.

2. A method of preparing a preform for a RTM molding process comprising the steps of:

forming a layer of reinforcing fibers;

applying a patterned discontinuous, homogenous liquid layer of a tackifier resin to at least one side of the layer of reinforcing fibers; wherein a predetermined quantity of the tackifier resin being forced into a number of the fibers; and curing the tackifier resin.

3. The method of claim 2 further comprising the step of preparing the tackified reinforcing fibers for shipping.

4. The method of claim 3 wherein the tackified reinforcing fibers are wrapped onto a roll.

5. The method of claim 3 wherein the tackified reinforcing fibers are cut and stacked.

6. The method of claim 1 wherein the patterned discontinuous layer of tackifier resin is applied by a patterned roller.

7. The method of claim 2 wherein the patterned discontinuous layer of tackifier resin is applied by at least one spray nozzle.

8. The method of claim 2 wherein the layer of reinforcing fibers is selected from the group consisting of unidirectional fibers, bi-directional fibers and random mat.

9. The method of claim 2 wherein the tackifier resin is selected from the group consisting of thermosetting resin, EM wave activated resin and self-curing resin.

10. The method of claim 2 wherein the tackifier resin is applied in a quantity of about ¼ percent to about 10 percent of the areal weight of the reinforcing fiber.

11. The method of claim 2 wherein the tackifier resin is applied in a quantity of about 30 volume percent to about 40 volume percent.

12. The method of claim 2 wherein the patterned discontinuous layer is in the form of a herringbone pattern.

13. The method of claim 2 further comprising forcing an effective quantity of tackifier resin into an effective number of fibers.

14. The method of claim 2 further comprising forcing a predetermined quantity of tackifier resin into a number of fibers as the tackifier resin is applied.

* * * * *

UNITED STATES PATENT AND TRADEMARK OFFICE
CERTIFICATE OF CORRECTION

PATENT NO.     : 6,740,185 B2
DATED          : May 25, 2004
INVENTOR(S)    : Baldwin, Jack W.

Page 1 of 1

It is certified that error appears in the above-identified patent and that said Letters Patent is hereby corrected as shown below:

<u>Column 1,</u>
Line 41, "yams" should be -- yarns --

Signed and Sealed this

Thirtieth Day of November, 2004

JON W. DUDAS
*Director of the United States Patent and Trademark Office*